(12) United States Patent
Handa

(10) Patent No.: US 10,576,687 B2
(45) Date of Patent: Mar. 3, 2020

(54) PHOTOFABRICATION METHOD

(71) Applicant: CMET INC., Yokohama-Shi (JP)

(72) Inventor: Yasuhiro Handa, Yokohama (JP)

(73) Assignee: CMET INC., Yokohama-Shi (JP)

(*) Notice: Subject to any disclaimer, the term of this patent is extended or adjusted under 35 U.S.C. 154(b) by 503 days.

(21) Appl. No.: 14/914,044

(22) PCT Filed: Aug. 28, 2014

(86) PCT No.: PCT/JP2014/072546
§ 371 (c)(1),
(2) Date: Feb. 24, 2016

(87) PCT Pub. No.: WO2015/030102
PCT Pub. Date: Mar. 5, 2015

(65) Prior Publication Data
US 2016/0207258 A1   Jul. 21, 2016

(30) Foreign Application Priority Data

Aug. 30, 2013  (JP) ................................. 2013-180023

(51) Int. Cl.
*B29C 64/386* (2017.01)
*B29C 64/135* (2017.01)
*B33Y 10/00* (2015.01)
*B33Y 50/02* (2015.01)
*B29K 105/00* (2006.01)

(52) U.S. Cl.
CPC .......... *B29C 64/386* (2017.08); *B29C 64/135* (2017.08); *B29K 2105/0058* (2013.01); *B33Y 10/00* (2014.12); *B33Y 50/02* (2014.12)

(58) Field of Classification Search
CPC ........................... B29C 64/386; B29C 64/393
See application file for complete search history.

(56) References Cited

U.S. PATENT DOCUMENTS

2009/0037011 A1   2/2009  Spiridonov et al.

FOREIGN PATENT DOCUMENTS

| JP | 2007021922 A | 2/2007 |
|----|--------------|--------|
| JP | 2011218821 A | 11/2011 |
| JP | 2012096426 A | 5/2012 |
| JP | 2012096427 A | 5/2012 |
| WO | 94022664 A1 | 10/1994 |

(Continued)

OTHER PUBLICATIONS

International Preliminary Search Report on Patentability; International Application No. PCT/JP2014/072546; International Filing Date Aug. 28, 2014, dated May 3, 2017, 7 pages.

(Continued)

*Primary Examiner* — Peter L Vajda
(74) *Attorney, Agent, or Firm* — Cantor Colburn LLP

(57) ABSTRACT

A controller places the set of three-dimensional objects in the formation area. The controller sets a plurality of placement zones in the formation area. The placement zones are defined by borderlines extending along an extension direction of a recoater for leveling a liquid surface. The controller places the three-dimensional objects in descending order of height in the placement zones. The three-dimensional objects are placed in each of the placement zones in order from a first placement zone of the placement zones.

12 Claims, 12 Drawing Sheets

(56) References Cited

FOREIGN PATENT DOCUMENTS

WO         2008107866 A1    9/2008
WO   WO 2008/107866    *    9/2008  ............. B29C 67/00

OTHER PUBLICATIONS

International Search Report dated Nov. 18, 2014.
International Preliminary Search Report on Patentability; International Application No. PCT/JP2014/07277; International Filing Date Aug. 28, 2014; dated May 1, 2016, 5 pages.

* cited by examiner

PHOTOFABRICATION METHOD

TECHNICAL FIELD

The present invention relates to a stereolithography method.

BACKGROUND ART

Stereolithography apparatuses have been in practical use to form a three-dimensional object by irradiating a light beam onto a curable material and partially curing the material. Stereolithography apparatuses allow for easy creation of components such as machine parts designed with a CAD system, enabling verification and direct evaluation of the design (see Patent Document 1, for example).

A stereolithography apparatus includes a vat and an elevator platform, which is lifted and lowered in the vat. The vat is filled with photocurable liquid resin, which serves as a curable material. The vat includes an opening in the upper section, and a light beam is directed into the vat through the opening. When forming a three-dimensional object, the stereolithography apparatus first positions the elevator platform at a height lower than the liquid surface of the photocurable liquid resin by the thickness of the bottom layer of the three-dimensional object to be formed. Then, the stereolithography apparatus moves the recoater along the liquid surface to level the liquid surface. The stereolithography apparatus then scans a light beam over the necessary area using the scanner to cure the photocurable liquid resin and form the bottom layer of the three-dimensional object. Then, the stereolithography apparatus lowers the elevator platform by the thickness of the layer next to the bottom layer, or the second layer, and forms the second layer in the same manner as the bottom layer. The stereolithography apparatus successively forms each of the layers in order from the bottom layer in the same manner to form the three-dimensional object.

PRIOR ART DOCUMENT

Patent Document

Patent Document 1: Japanese Laid-Open Patent Publication No. 2011-218821

SUMMARY OF THE INVENTION

Problems that the Invention is to Solve

When using the stereolithography apparatus described above to simultaneously form a plurality of three-dimensional objects in the formation area, which is scanned by a light beam, the user creates data in which the three-dimensional objects are placed within the formation area. Thus, there is a need for a stereolithography method that automatically places a plurality of three-dimensional objects in the formation area when forming the three-dimensional objects simultaneously. It is desirable that three-dimensional objects be placed in the formation area such that as many three-dimensional objects as possible are formed.

Accordingly, it is an objective of the present invention to provide a stereolithography method that automatically places a plurality of three-dimensional objects in a formation area in an efficient manner when forming the three-dimensional objects simultaneously.

Means for Solving the Problems

The means for achieving the objective and its advantages are as follows.

The stereolithography method for solving the object is a stereolithography method for forming a formed object that corresponds to a set of three-dimensional objects in a formation area on an elevator platform by selectively directing a light beam to a curable material and curing the curable material. The method is characterized in that a controller places the set of three-dimensional objects in the formation area, the controller sets a plurality of placement zones in the formation area, wherein the placement zones are defined by borderlines extending along an extension direction of a recoater for leveling a liquid surface, and the controller places the three-dimensional objects in descending order of height in the placement zones, wherein the three-dimensional objects are placed in each of the placement zones in order from a first placement zone of the placement zones.

In this method, a plurality of placement zones, which are defined by the borderlines extending in the extension direction of the recoater, are set. The three-dimensional objects to be formed are placed in each of the placement zones in order from the first placement zone. In addition, the three-dimensional objects are placed in descending order of height. Three-dimensional objects are simply placed according to the heights in order from the first placement zone. This facilitates automatic placement of a plurality of three-dimensional objects in the formation area when forming the three-dimensional objects simultaneously. In addition, when not the whole of the formation area on the elevator platform is occupied by three-dimensional objects, placement zones in the formation area on the elevator platform are reduced and formed objects having greater heights are concentrated in the placement zones. This minimizes the irradiation area of the light beam and achieves efficient formation of three-dimensional objects.

In the stereolithography method described above, the plurality of placement zones preferably includes three or more placement zones, and for an integer n that is greater than or equal to 2, the (n+1)th placement zone is preferably set such that the first to (n−1)th placement zones are arranged between the nth placement zone and the (n+1)th placement zone.

In this method, the first to (n−1)th placement zones are arranged between the nth placement zone and the (n+1)th placement zone. Thus, when not the whole of the formation area on the elevator platform is occupied by three-dimensional objects, the irradiation area of the light beam is limited to the area around the first placement zone in the formation area on the elevator platform. This minimizes the irradiation area of the light beam and achieves efficient formation of three-dimensional objects.

In the stereolithography method described above, the plurality of placement zones preferably includes three or more placement zones. Each of the placement zones is preferably adjacent to another of the placement zones. For an integer n that is greater than or equal to 2, from the areas in the formation area that are unoccupied by placement zones, the (n+1)th placement zone is preferably in one of the areas that is greater in width in the movement direction of the recoater.

In this method, from the areas in the formation area that are unoccupied by placement zones, the (n+1)th placement zone is set in one of the areas that is greater in width in the movement direction of the recoater. This minimizes the section in the formation area that is unoccupied by placement zones.

In the stereolithography method described above, the first placement zone preferably includes the center of the movement range of the recoater in the movement direction of the recoater.

In this method, the first placement zone is set in a section including the center in the movement range of the recoater. Thus, when not the whole of the formation area on the elevator platform is occupied by three-dimensional objects, the irradiation area of the light beam is limited to the vicinity of the center in the movement range of the recoater in the formation area on the elevator platform. This minimizes the irradiation area of the light beam and achieves efficient formation of three-dimensional objects.

In the stereolithography method described above, the first placement zone is preferably adjacent to the first edge of the formation area in the movement direction of the recoater, and for an integer n that is greater than or equal to 2, the nth placement zone is preferably adjacent to the (n−1)th placement zone.

In this method, the placement zones are set in order from the first edge in the formation area. This facilitates setting of placement zones compared to when placement zones are placed on opposite sides of the first placement zone at the center.

In the stereolithography method described above, in each of the placement zones in which three or more three-dimensional objects are placed, for an integer n that is greater than or equal to 2, the three-dimensional object having the (n+1)th greatest height is preferably set such that the three-dimensional objects having the greatest to (n−1)th greatest heights are located between the three-dimensional object having the nth greatest height and the three-dimensional object having the (n+1)th greatest height.

In this method, the three-dimensional objects having the greatest to (n−1)th greatest heights are located between the three-dimensional object having the nth greatest height and the three-dimensional object having the (n+1)th greatest height. This places higher three-dimensional objects in the vicinity of the center of each placement zone, limiting the irradiation area of the light beam to the vicinity of the center in the extension range of the recoater in the formation area on the elevator platform. This minimizes the irradiation area of the light beam and achieves efficient formation of three-dimensional objects.

In the stereolithography method described above, in each of the placement zones in which three or more three-dimensional objects are placed, for an integer n that is greater than or equal to 2, from the areas in the placement zone that are unoccupied by three-dimensional objects, the three-dimensional object having the (n+1)th greatest height is preferably placed in one of the areas that is greater in width in the extension direction of the recoater.

In this method, from the areas in the placement zone that are unoccupied by three-dimensional objects, the three-dimensional object having the (n+1)th greatest height is placed in one of the areas that is greater in width in the extension direction of the recoater. This minimizes the section in the placement zone that is unoccupied by three-dimensional objects.

In the stereolithography method described above, the highest three-dimensional object is preferably placed in a central section in the placement zone in the direction corresponding to the width of the recoater in the extension direction of the recoater.

In this method, the highest three-dimensional object is placed in a central section in the extension range of the recoater. This places a high three-dimensional object in the central section of each placement zone, limiting the irradiation area of the light beam to the central section in the extension range of the recoater in the formation area on the elevator platform. This minimizes the irradiation area of the light beam and achieves efficient formation of three-dimensional objects.

In the stereolithography method described above, in each of the placement zones in which two or more three-dimensional objects are placed, a three-dimensional object having the greatest height is preferably placed adjacent to the first edge of the placement zone in the movement direction of the recoater. Also, for an integer n that is greater than or equal to 2, the three-dimensional object having the nth greatest height is preferably placed adjacent to the three-dimensional object having the (n−1)th greatest height.

In this method, three-dimensional objects are placed in order from the first edge of the placement zone. This facilitates the placement of three-dimensional objects compared to when three-dimensional objects are placed on opposite sides of the highest three-dimensional object at the center.

In the stereolithography method described above, after the first placement of three-dimensional objects is completed in each placement zone and before placing three-dimensional objects in the next placement zone, the three-dimensional objects that are yet to be placed and able to be placed in an empty region, which is unoccupied by three-dimensional objects, in the placement zone are preferably placed in descending order of height in the empty region.

In this method, the three-dimensional objects that are yet to be placed and able to be placed in empty regions in the placement zone in which other three-dimensional objects are already placed are placed in the empty regions in descending order of height. The effective use of empty regions in placement zones increases the number of three-dimensional objects placed in each placement zone.

In the stereolithography method described above, after the first placement of three-dimensional objects is completed in each placement zone and before placing three-dimensional objects in the next placement zone, the three-dimensional objects that are already placed in the placement zone are preferably re-placed at positions closer to the first edge of the placement zone in the movement direction of the recoater. Then, three-dimensional objects yet to be placed are preferably placed in descending order of height in an empty region, which is unoccupied by three-dimensional objects, in the placement zone.

In this method, the three-dimensional objects already placed in a placement zone are close to one edge, and then the three-dimensional objects that are yet to be placed and able to be placed in empty regions are placed in descending order of height. Moving the three-dimensional objects that are already placed toward one edge maximizes empty regions in the movement direction of the recoater. This allows larger three-dimensional objects to be placed in the empty regions.

In the stereolithography method described above, two directions that are parallel to the bases of the three-dimensional objects and perpendicular to each other are preferably defined, and the longer of the lengths in the two directions of each three-dimensional object is preferably defined as the length in the extension direction of the recoater.

In this method, the longer of the lengths in the two directions that are parallel to the bases of the three-dimensional objects and perpendicular to each other is defined as the length in the extension direction of the recoater. This limits unnecessary increase in the lengths of placement zones in the movement direction of the recoater that may otherwise be caused depending on the lengths of the three-dimensional objects.

In the stereolithography method described above, the width in the movement direction of the recoater of each placement zone is preferably changed according to the lengths in the movement direction of the recoater of the three-dimensional objects that are placed in the placement zone.

In this method, the width in the movement direction of the recoater of each placement zone is set according to the lengths in the movement direction of the recoater of the three-dimensional objects that are placed in the placement zone. This adequately sets the width in the movement direction of the recoater of the placement zone according to the three-dimensional objects, allowing for efficient placement of placement zones.

Effects of the Invention

The present invention automatically places a plurality of three-dimensional objects in a formation area in an efficient manner when forming the three-dimensional objects simultaneously.

MODES FOR CARRYING OUT THE INVENTION

First Embodiment

A stereolithography apparatus according to a first embodiment will now be described with reference to FIGS. 1 to 7.

Figure 1:
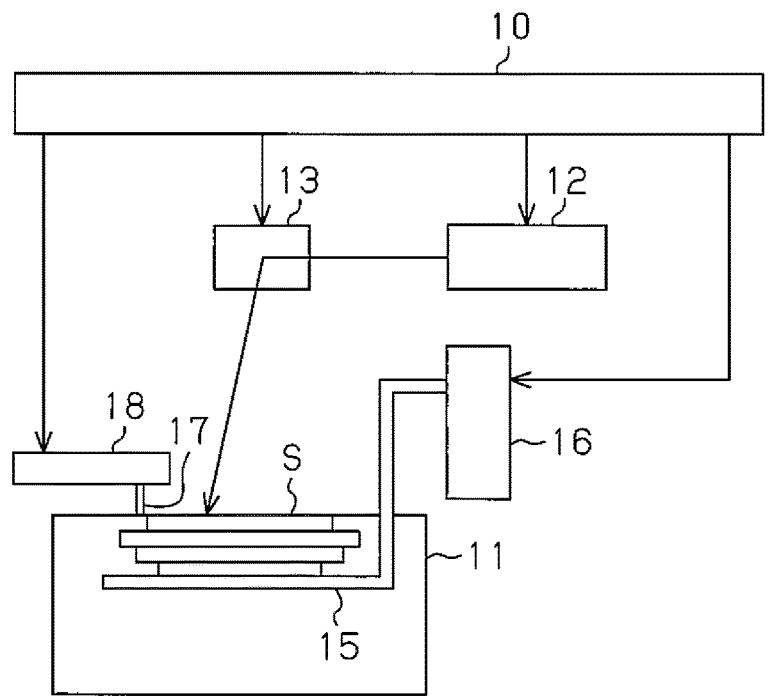
FIG. 1 is a schematic view showing a stereolithography apparatus of a first embodiment.

As shown in FIG. 1, the stereolithography apparatus includes a vat 11, which is filled with photocurable liquid resin serving as a curable material, a laser 12, which emits a light beam, and a scanner 13, which directs the light beam emitted by the laser 12 to the vat 11. The light beam emitted by the laser 12 is directed to the scanner 13 through an optical device. The stereolithography apparatus includes an elevator platform 15, which is lifted and lowered in the vat 11. A platform driving device 16 lifts and lowers the elevator platform 15. A recoater 17 for leveling the liquid surface is located above the vat 11. A recoater driving device 18 moves the recoater 17 in the front-rear direction (the lateral direction as viewed in the drawing). A controller 10 controls the laser 12, the scanner 13, the platform driving device 16, and the recoater driving device 18.

The stereolithography apparatus forms a set of three-dimensional objects S by selectively directing a light beam to the upper surface of the elevator platform 15 in the vat 11, which is filled with photocurable liquid resin, to cure the photocurable liquid resin. The formed three-dimensional objects S are referred to as formed objects. A perforated plate is used for the elevator platform 15 to facilitate passing of the photocurable resin in the vat 11 between the lower and upper surfaces of the elevator platform 15.

Referring to FIGS. 2 to 7, automatic placement of three-dimensional objects S performed by the stereolithography apparatus will now be described.

Figure 2:
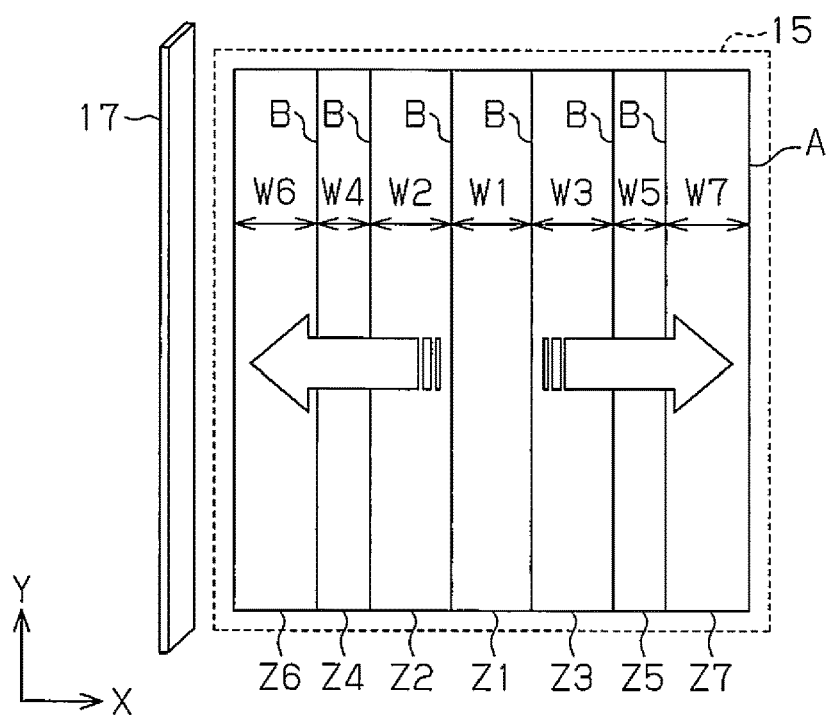
FIG. 2 is a diagram showing the placement zones of the stereolithography method of the first embodiment.

As shown in FIG. 2, the area on the elevator platform 15 in which three-dimensional objects S can be formed is referred to as a formation area A. The controller 10 sets placement zones Z, in which three-dimensional objects S are placed, in the formation area A. The placement zones Z are defined by borderlines B extending in the extension direction Y of the recoater 17 (hereinafter referred to as the Y direction) so that placement zones Z are set side by side in the movement direction X of the recoater 17 (hereinafter referred to as the X direction) in the formation area A. The controller 10 sets the first placement zone Z1 that includes the center of the formation area A in the X direction. The placement zones Z include three or more placement zones Z. For an integer n that is greater than or equal to 2, the (n+1)th placement zone Z(n+1) is set such that the first to (n−1)th placement zones Z1 to Z(n−1) are arranged between the nth placement zone Zn and the (n+1)th placement zone Z(n+1).

That is, the controller 10 sets the second placement zone Z2 to be adjacent to the first placement zone Z1. In FIG. 2, the second placement zone Z2 is set adjacent to the first placement zone Z1 in the negative X direction (on the left side as viewed in the drawing). For an integer n that is greater than or equal to 3 (n≥3), the nth placement zone Zn is set such that the first to (n−2)th placement zones Z1 to Z(n−2) are arranged between the (n−1)th placement zone Z(n−1) and the nth placement zone Zn. The controller 10 sets the second placement zone Z2 to be adjacent to the first placement zone Z1. In FIG. 2, the second placement zone Z2 is set to be adjacent to the first placement zone Z1 in the negative X direction (on the left side as viewed in the drawing). As for the third placement zone Z3 and subsequent placement zones, for an integer n that is greater than or equal to 2 (n≥2), the (n+1)th placement zone Z(n+1) is set such that the first to (n−1)th placement zones Z1 to Z(n−1) are arranged between the nth placement zone Zn and the (n+1)th placement zone Z(n+1).

In other words, the placement zones Z are set such that the first placement zone Z1 is arranged between the second placement zone Z2 and the third placement zone Z3, the first and second placement zones Z1 and Z2 are arranged between the third placement zone Z3 and the fourth placement zone Z4. As for the fourth placement zone Z4 and subsequent placement zones, the first to (n−1)th placement zones Z1 to Z(n−1) are arranged between the nth placement zone Zn and the (n+1)th placement zone Z(n+1). The second placement zone Z2 is located on the left side of the first placement zone Z1 as viewed in FIG. 2, and the third placement zone Z3 is located on the right side of the first placement zone Z1 as viewed in FIG. 2. The fourth placement zone Z4 is located on the left side of the first placement zone Z1 as viewed in FIG. 2, and the fifth placement zone Z5 is located on the right side of the first placement zone Z1 as viewed in FIG. 2. The controller 10 changes the width W in the X direction of each placement zone Z according to the lengths in the X direction of the three-dimensional objects S to be formed.

Figure 3:
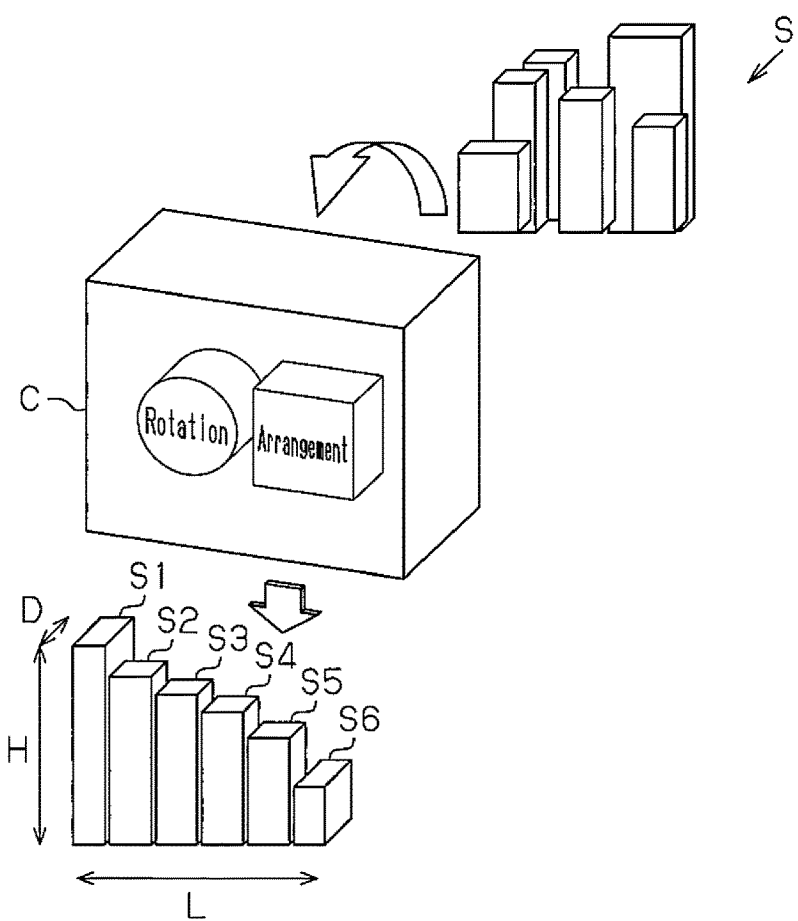
FIG. 3 is a diagram showing rotation and arrangement of three-dimensional objects according to the stereolithography method of the first embodiment.

Then, as shown in FIG. 3, the controller 10 obtains the data of the three-dimensional objects S to be formed and enters the data into a virtual formation container C. The three-dimensional objects S entered in the formation container C are rotated and arranged. The formation container C is a program for arranging the three-dimensional objects S to be formed. In the formation container C, each of the three-dimensional objects S to be formed is measured for outer dimensions as a virtual cuboid, and the outer dimension of the longest side among the outer dimensions of the sides of the virtual cuboid of each three-dimensional object S is defined as a height H. Additionally, the formation container C defines the longer of the outer dimensions of the virtual cuboid of the three-dimensional object S other than the height H as a depth D and the shorter of the outer dimensions other than the height as a width L. The three-dimensional objects processed in the formation container C are arranged in descending order of the height H of the outer dimensions of virtual cuboids with the orientations of the depths D and widths L aligned. The controller 10 outputs the data of the three-dimensional objects S, which has been entered into the formation container C, from the formation container C.

Figure 4:
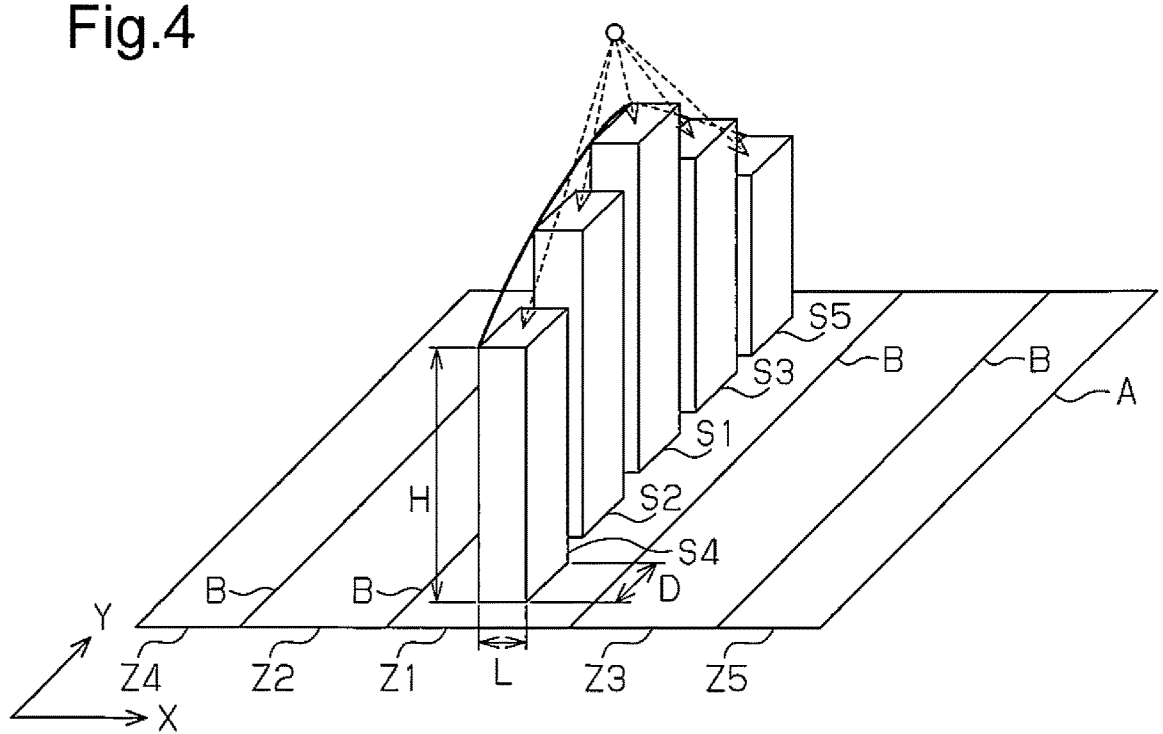
FIG. 4 is a diagram showing placement of three-dimensional objects according to the stereolithography method of the first embodiment.

Then, as shown in FIG. 4, the three-dimensional objects S to be formed are placed along the Y direction in each placement zone Z according to the height H. The three-dimensional objects S are placed such that the center of the width L of each three-dimensional object S is located at the center of the width W in the X direction of each placement zone Z. The controller 10 places the highest three-dimensional object S1 at the center in the Y direction. When placing three or more three-dimensional objects S in one placement zone Z, the controller 10 places, for an integer n that is greater than or equal to 2, the three-dimensional object S(n+1) having the (n+1)th greatest height such that the three-dimensional objects S1 to S(n−1) having the greatest to (n−1)th greatest heights are located between the three-dimensional object Sn having the nth greatest height and the three-dimensional object S(n+1) having the (n+1)th greatest height.

That is, the controller 10 places the highest three-dimensional object S1 between the second highest three-dimensional object S2 and the third highest three-dimensional object S3, and places the highest and second highest three-dimensional objects S1 and S2 between the third highest three-dimensional object S3 and the fourth highest three-dimensional object S4. As for the fourth highest three-dimensional object S4 and subsequent three-dimensional objects, the controller 10 places the highest to (n−1)th highest three-dimensional objects S1 to S(n−1) between the nth highest three-dimensional object Sn and the (n+1)th highest three-dimensional object S(n+1). The fourth highest three-dimensional object S4 is located frontward of the highest three-dimensional object S1 in the Y direction as viewed in FIG. 4, while the fifth highest three-dimensional object S5 is located rearward of the highest three-dimensional object S1 in the Y direction. The controller 10 defines the depth D of each three-dimensional object S as the length in the Y direction. This limits unnecessary increase in the width W of the placement zone Z. To avoid interference between the three-dimensional objects S, the three-dimensional objects S are placed in the placement zones Z so as to be separated from the borderlines B of the placement zones Z by a few millimeters.

When placing a set of three-dimensional objects S in the formation area A, the controller 10 places three-dimensional objects S in descending order of height and in order from the first placement zone Z1. When there is no more area left in the first placement zone Z1 to place a three-dimensional object S, three-dimensional objects S that are yet to be placed are placed by the controller 10 in the second placement zone Z2 in descending order of height. The controller 10 places three-dimensional objects S in each of the placement zones Z in order of the first placement zone Z1, the second placement zone Z2, the third placement zone Z3, the fourth placement zone Z4, and subsequent placement zones. Placement of three-dimensional objects S in the placement zones Z ends when there are no more three-dimensional objects S left in the formation container C.

Figure 5:
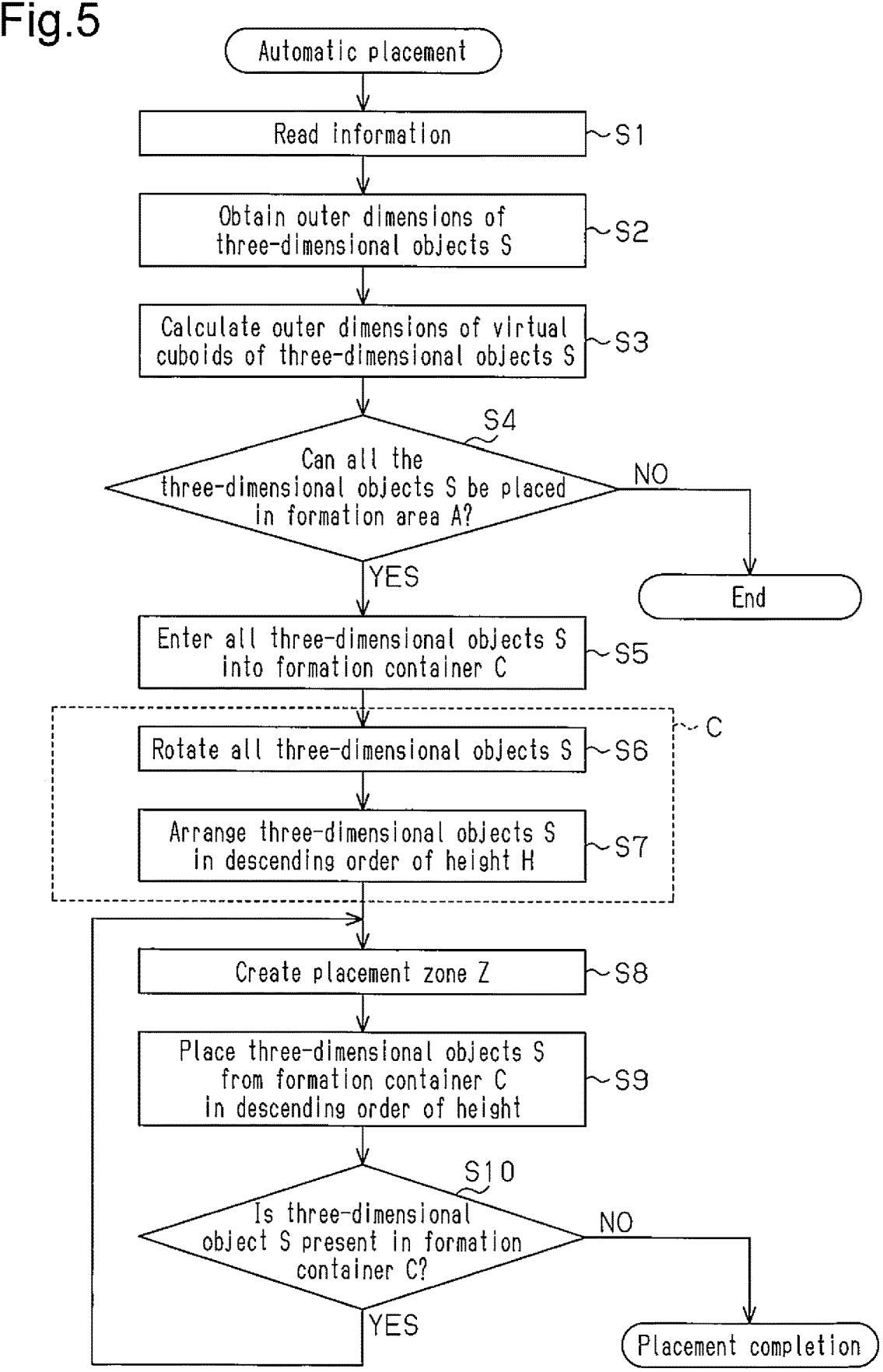
FIG. 5 is a flowchart of the placement process of three-dimensional objects according to the stereolithography method of the first embodiment.

Referring to FIG. 5, the process of automatic placement performed by the controller 10 will now be described.

The controller 10 first reads information (step S1). That is, the controller 10 reads information such as the size of the elevator platform 15, the allowable formation size of the vat 11, and the movement direction X of the recoater 17, from an input or memory device (not shown). The controller 10 identifies the formation area A and the formable space based on the information.

Then, the controller 10 obtains the outer dimensions of each three-dimensional object S to be formed (step S2). That is, the controller 10 obtains the outer dimensions from the CAD data of three-dimensional objects S to be formed that is entered in the controller 10, for example.

Then, the controller 10 calculates the outer dimensions of the virtual cuboid of each three-dimensional object S (Step S3). The controller 10 virtualizes the smallest cuboid that can contain the three-dimensional object S and calculates the outer dimensions of the virtual cuboid. Thus, even when three-dimensional objects S have complicated outer shapes, creating the virtual cuboids corresponding to the three-dimensional objects S allows the three-dimensional objects S to be rearranged according to the lengths of sides of the cuboids and placed automatically.

Then, the controller 10 determines whether all the three-dimensional objects S can be placed in the formation area A (step S4). More specifically, the controller 10 determines whether the sum of the areas of bases of the virtual cuboids of the three-dimensional objects S to be formed is smaller than the area of the formation area A. If the sum of the areas of bases of the virtual cuboids of the three-dimensional objects S to be formed is larger than the area of the formation area A, the controller 10 determines that not all the three-dimensional objects S can be placed in the formation area A (step S4: NO) and ends the automatic placement.

If the sum of the areas of bases of the virtual cuboids of the three-dimensional objects S to be formed is smaller than the area of the formation area A, the controller 10 determines that all the three-dimensional objects S can be placed in the formation area A (step S4: YES) and proceeds to the process of step S5.

In step S5, the controller 10 enters all the three-dimensional objects S into the formation container C. In other words, the controller 10 inputs the outer dimensions of the three-dimensional objects S to be formed into the formation container C. In this embodiment, the controller 10 inputs the outer dimensions of the virtual cuboids into the formation container C.

The controller 10 rotates all the three-dimensional objects S in the formation container C (step S6). That is, the controller 10 rotates all the three-dimensional objects S such that the longer of the outer dimensions other than the height H of the virtual cuboid of each three-dimensional object S extends along the depth D.

The controller 10 arranges all the three-dimensional objects S in descending order of the height H in the formation container C (step S7). In other words, the controller 10 arranges all the three-dimensional objects S in descending order of the height H of virtual cuboids of the three-dimensional objects S.

Then, the controller 10 creates placement zones Z in the formation area A (step S8). That is, the controller 10 sets borderlines B, which are parallel to the Y direction, in the formation area A to set placement zones Z that are adjacent to each other in the X direction in the formation area A. The width W of each placement zone Z is changed according to the widths L of the three-dimensional objects S to be placed in the placement zone Z.

The first placement zone Z1 is set in a section that includes the center in the X direction. The first placement zone Z1 is arranged between the second placement zone Z2 and the third placement zone Z3. The first to third placement zones Z1 to Z3 are arranged between the fourth placement zone Z4 and the fifth placement zone Z5 (see FIG. 2). The second placement zone Z2 and subsequent placement zones are set if there are any three-dimensional objects that are yet to be placed.

The controller 10 then moves three-dimensional objects S to be formed from the formation container C into the placement zone Z in descending order of the height H (step S9). In other words, the controller 10 moves three-dimensional objects S from the formation container C into the first placement zone Z1 in descending order of the height H such that the depths D of the three-dimensional objects S extend in the Y direction.

Then, the controller 10 determines whether any three-dimensional object S is present in the formation container C (step S10). In other words, the controller 10 checks if any three-dimensional object S to be placed is left in the formation container C. If no three-dimensional object S to be placed is left in the formation container C (step S10: NO), the controller 10 ends the placement.

If one or more three-dimensional objects S to be placed are left in the formation container C (step S10: YES), not all the three-dimensional objects S are placed in the first placement zone Z1. Thus, when one or more three-dimensional objects S to be placed are left in the formation container C (step S10: YES), the controller 10 proceeds to the process of step S8. That is, the controller 10 sets the second placement zone Z2 after the first placement zone Z1 to place the three-dimensional objects S that cannot be placed in the first placement zone Z1 (step S8). The controller 10 repeats steps S8 to S10 until completing the placement.

In step S10, if one or more three-dimensional objects S remain in the formation container C but cannot be placed in the formation area A, that is, if the controller 10 fails to set an appropriate placement zone in the formation area A, the controller 10 displays a corresponding notification and ends the placement.

The three-dimensional objects S to be formed are placed in descending order of the height H starting from the center in the X and Y directions in the formation area A and arranged side by side in a placement zone Z extending in the Y direction. When there are many three-dimensional objects S to be formed, three-dimensional objects S are placed in each of placement zones Z arranged along the X direction.

Figure 6:
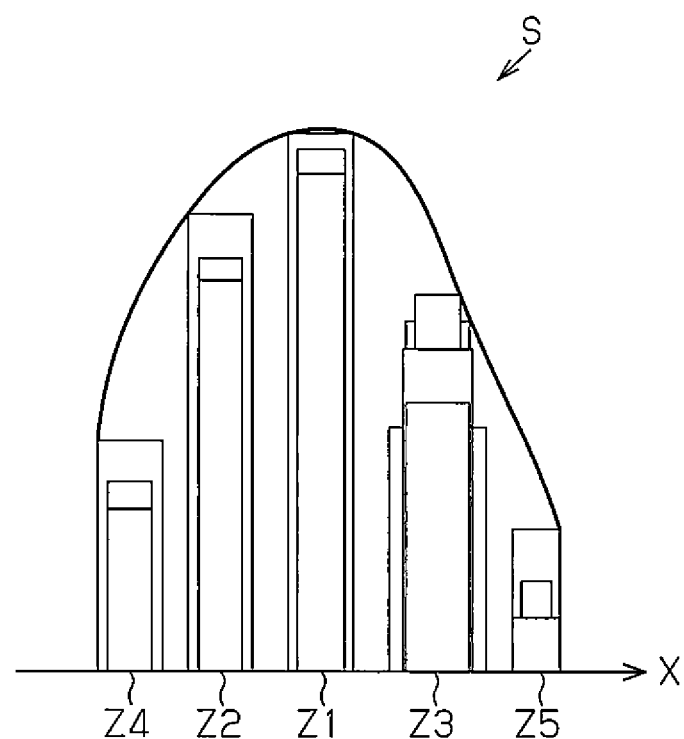
FIG. 6 is a diagram showing a state of three-dimensional objects that are placed by the stereolithography method of the first embodiment.

As shown in FIG. 6, the heights H of the three-dimensional objects S placed in the formation area A are greatest at the center in the X direction and decrease as the distances from the center increase. Thus, as the formation of the three-dimensional objects S progresses to increase the heights H of the formed objects, formation is performed only in the area around the center in the X direction. The light that solidifies the formed objects is emitted from the laser 12, passes through the scanner 13, and is guided by the scanner 13. The light is not perpendicularly incident onto areas away from the scanner 13, slightly decreasing the accuracy. A device for adjusting focus (not shown) may be used, but this may still decrease the accuracy. Concentrating as many three-dimensional objects S as possible at the center of the formation area A increases the accuracy in formation of the three-dimensional object S. The scanner 13 is typically located above the center of the formation area A. If the scanner 13 is located away from the center, it is preferable that the first placement zone Z1 be set under the scanner 13.

Figure 7:
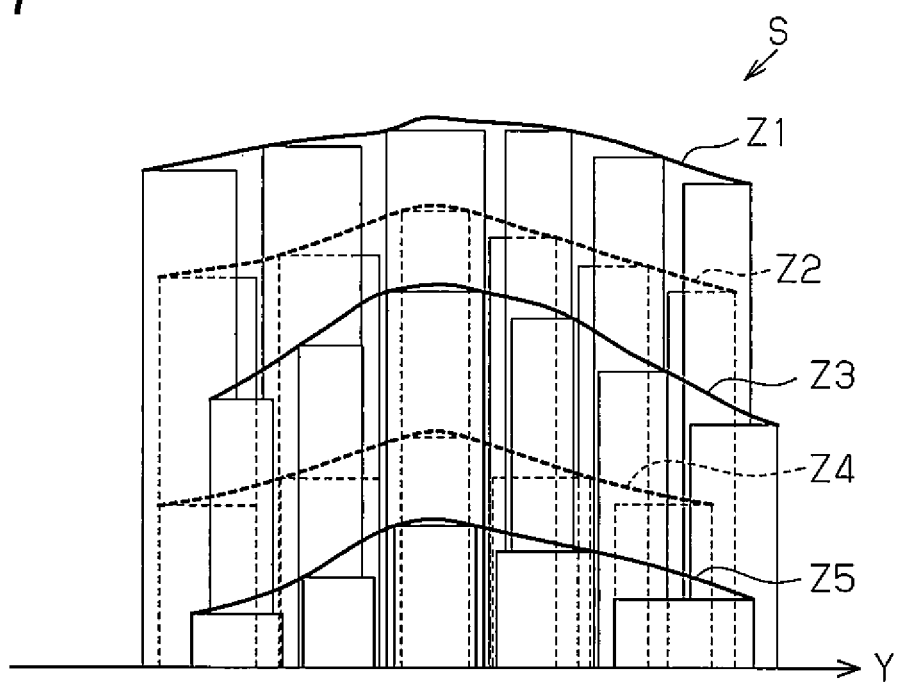
FIG. 7 is a diagram showing a state of three-dimensional objects that are placed by the stereolithography method of the first embodiment.

As shown in FIG. 7, the heights H of the three-dimensional objects S placed in the formation area A are greatest at the center in the Y direction and decrease at greater distances from the center. Thus, as the formation of the three-dimensional objects S progresses increasing the heights H, formation is performed only in the vicinity of the center in the Y direction.

The controller 10 forms the formed objects based on the placement data in which the three-dimensional objects S are placed in the formation area A. As the heights H of the formed objects increase, formation is performed only in the vicinity of the center in the X and Y directions. This limits the irradiation area of the light beam during formation, improving the efficiency in formation of three-dimensional objects S.

The advantages of the present embodiment will now be described.

(1) A plurality of placement zones Z, which is defined by borderlines B extending along the Y direction, is set. The three-dimensional objects S to be formed simultaneously are placed in each of the placement zones Z in order from the first placement zone Z1. In addition, the three-dimensional objects S are placed in descending order of the height H. Three-dimensional objects S are simply placed according to the heights H in order from the first placement zone Z1. This facilitates automatic placement of a plurality of three-dimensional objects S in the formation area A when forming the three-dimensional objects S simultaneously. In addition, when not the whole of the formation area A on the elevator platform 15 is occupied by three-dimensional objects S, placement zones Z in the formation area A on the elevator platform 15 are reduced and the formed objects having greater heights H are concentrated in the placement zones Z. This minimizes the irradiation area of the light beam and achieves efficient formation of three-dimensional objects.

(2) A plurality of placement zones Z is set on opposite sides of the first placement zone Z1. Thus, when not the whole of the formation area A on the elevator platform 15 is occupied by three-dimensional objects S, the irradiation area of the light beam is limited to the area around the first placement zone Z1 in the formation area A on the elevator platform 15. This minimizes the irradiation area of the light beam and achieves efficient formation of three-dimensional objects S.

(3) The first placement zone Z1 is set in a section including the center in the X direction. Thus, when not the whole of the formation area A on the elevator platform 15 is occupied by three-dimensional objects S, the irradiation area of the light beam is limited to the vicinity of the center in the X direction in the formation area A on the elevator platform 15. This minimizes the irradiation area of the light beam and achieves efficient formation of three-dimensional objects.

(4) The highest three-dimensional object S1 is placed at the center in the Y direction, and three-dimensional objects are placed on opposite sides of the highest three-dimensional object S1. This places a higher three-dimensional object S at the center of each placement zone Z, limiting the irradiation area of the light beam to the vicinity of the center in the Y direction in the formation area A on the elevator platform 15. This minimizes the irradiation area of the light beam and achieves efficient formation of three-dimensional objects.

(5) The longer of the dimensions other than the height H of a three-dimensional object S is set as the length in the Y direction. This limits unnecessary increase in the length of placement zones Z in the X direction that may otherwise be caused depending on the lengths of formed objects.

(6) The width in the X direction of a placement zone Z is set according to the depths D in the X direction of the three-dimensional objects S. This adequately sets the width in the X direction of the placement zone Z according to the three-dimensional objects S, allowing for efficient setting of placement zones Z.

(7) Each three-dimensional object S is measured for outer dimensions as a virtual cuboid. Thus, the height H, depth D, and width L of a three-dimensional object S can be obtained easily even when the three-dimensional object S has a complicated shape.

Second Embodiment

Referring to FIGS. 8 to 11, a stereolithography method according to a second embodiment will now be described. This embodiment of stereolithography method differs from the first embodiment in that, after placing three-dimensional objects S in one placement zone Z, the three-dimensional objects S that are yet to be placed and able to be placed in an empty region in the placement zone Z are placed in the empty region. The following descriptions focus on the differences from the first embodiment.

Figure 8:
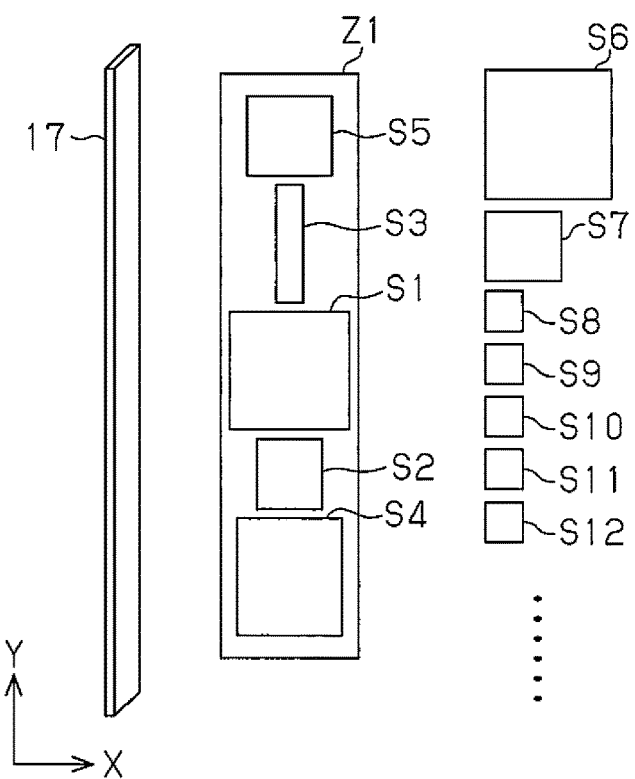
FIG. 8 is a diagram showing placement of three-dimensional objects according to a stereolithography method of a second embodiment.

As shown in FIG. 8, three-dimensional objects S to be formed are placed in the first placement zone Z1 along the Y direction according to the heights H. That is, in the same manner as the first embodiment, the controller 10 places the highest three-dimensional object S1 at the center in the Y direction. Further, the controller 10 places the second highest three-dimensional object S2 and subsequent three-dimensional objects such that, when n is a multiple of 2, the highest to (n−1)th highest three-dimensional objects S1 to S(n−1) are located between the nth highest three-dimensional object Sn and the (n+1)th highest three-dimensional object S(n+1). The highest to fifth highest three-dimensional objects S1 to S5 are placed in the first placement zone Z1. The controller 10 defines the depths D of the three-dimensional objects S as the lengths in the Y direction. The placement described above is referred to as the first placement of three-dimensional objects S.

Figure 9A:
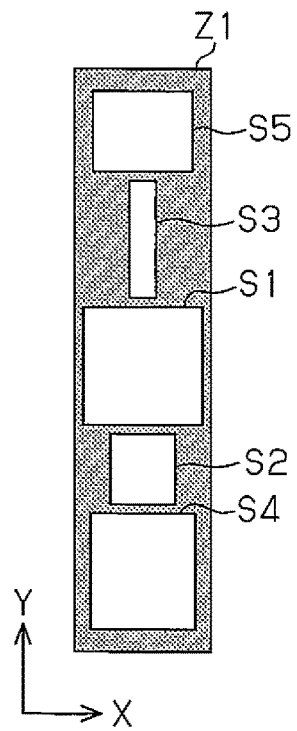
FIGS. 9A and 9B are diagrams showing placement of three-dimensional objects according to the stereolithography method of the second embodiment.

As shown in FIG. 9A, the first placement zone Z1 includes empty regions, which are unoccupied by the three-dimensional objects S. The empty regions are shown shaded with dots. For example, empty regions are present on opposite sides in the X direction (on the right and left sides) of the third highest three-dimensional object S3.

Figure 9B:
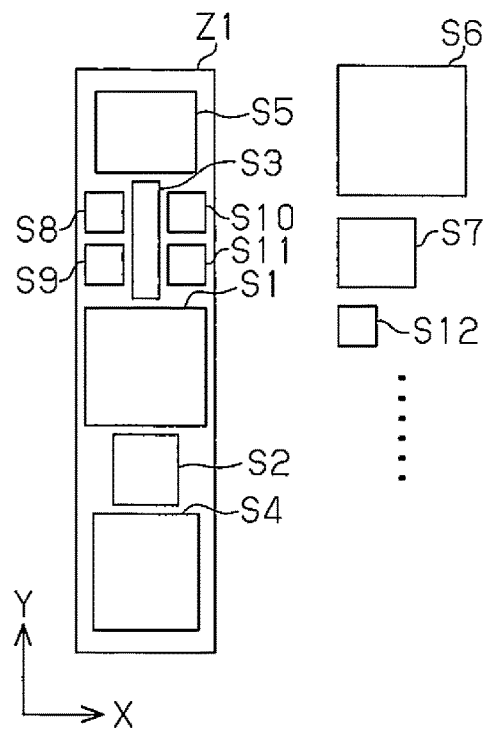

As shown in FIG. 9B, after the first placement of three-dimensional objects S as described above is completed, the three-dimensional objects S that are yet to be placed and able to be placed in an empty region in the first placement zone Z1 are placed in the empty region. Thus, the eighth highest three-dimensional object S8 and the ninth highest three-dimensional object S9 are placed in the empty region on the left side in the X direction of the third highest three-dimensional object S3. Further, the tenth highest three-dimensional object S10 and the eleventh highest three-dimensional object S11 are placed in the empty region on the right side in the X direction of the third highest three-dimensional object S3. Each of the three-dimensional objects S yet to be placed is checked in descending order of height if the three-dimensional object S can be placed in an empty region in the placement zone Z. Accordingly, the sixth and seventh highest three-dimensional objects S6 and S7, which cannot be placed in the first placement zone Z1, remain yet to be placed.

When no more three-dimensional objects S are left that can be placed in an empty region in the first placement zone Z1, the controller 10 places remaining three-dimensional objects S in order of the second placement zone Z2, the third placement zone Z3, the fourth placement zone Z4 and subsequent zones in the same manner. The placement of three-dimensional objects S in placement zones Z ends when no more three-dimensional objects S are left in the formation container C.

Figure 10:
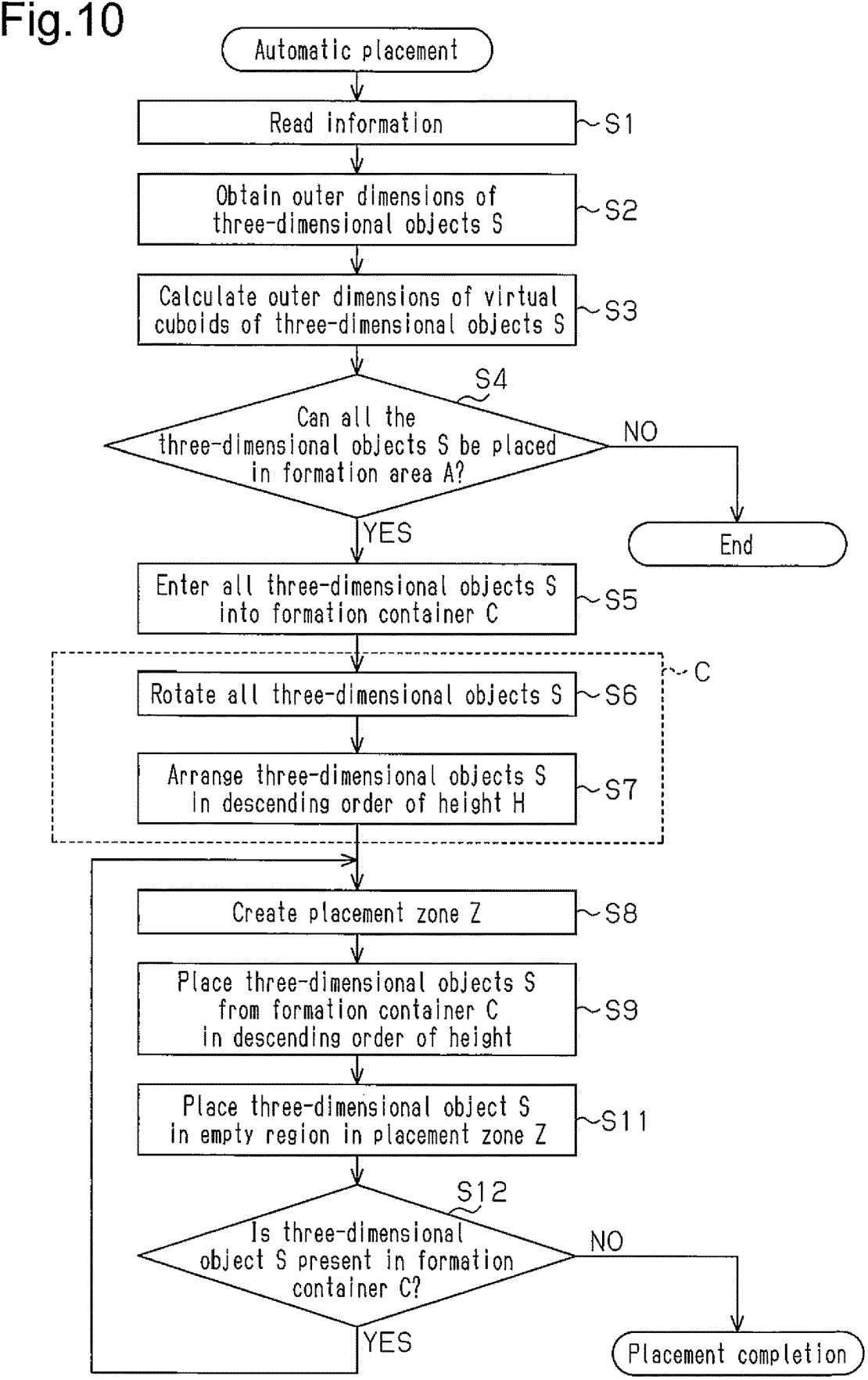
FIG. 10 is a flowchart of the placement process of three-dimensional objects according to the stereolithography method of the second embodiment.

Referring to FIG. 10, the automatic placement process of the controller 10 will now be described.

As shown in FIG. 10, the controller 10 performs steps S1 to S9 in the same manner as the first embodiment. In other words, the controller 10 moves three-dimensional objects S from the formation container C into the first placement zone Z1 in descending order of the height H such that the depths D of the three-dimensional objects S extend in the Y direction (FIG. 8).

Then, the controller 10 places three-dimensional objects S in empty regions in the placement zone Z, in which other three-dimensional objects S are already placed, in descending order of the height H (step S11). That is, the controller 10 checks each of the three-dimensional objects S left in the formation container C in descending order of the height H to determine whether the three-dimensional object S can be placed in an empty region in the placement zone Z and places if possible (FIG. 9). To determine whether a three-dimensional object S can be placed in an empty region in the placement zone Z, the maximum width in the X direction of the empty region and the width L of the three-dimensional object S yet to be placed are compared. The maximum widths in the X direction of empty regions are updated each time when a three-dimensional object S is placed.

Then, the controller 10 determines whether any three-dimensional object S is present in the formation container C (step S12). In other words, the controller 10 checks if any three-dimensional object S to be placed is left in the formation container C. If no three-dimensional object S to be placed is left in the formation container C (step S12: NO), the controller 10 ends the placement. In step S12, if one or more three-dimensional objects S remain in the formation container C but cannot be placed in the formation area A (step S12: NO), the controller 10 displays a corresponding notification and ends the placement.

If one or more three-dimensional objects S to be placed are left in the formation container C (step S12: YES), that is, not all the three-dimensional objects S are placed in the first placement zone Z1, the controller 10 proceeds to the process of step S8. In other words, the controller 10 sets the second placement zone Z2 after the first placement zone Z1 in order to place the three-dimensional objects S that cannot be placed in the first placement zone Z1 (step S8). The controller 10 repeats steps S8, S9, S11 and S12 until completing the placement.

Figure 11A:
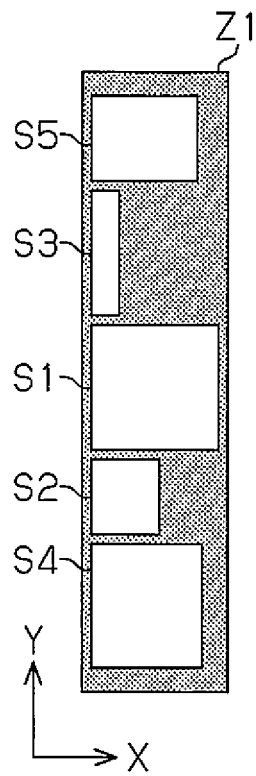
FIGS. 11A and 11B are diagrams showing placement of three-dimensional objects according to a stereolithography method of a modification.

Accordingly, the three-dimensional objects S to be formed are placed side by side in placement zones Z extending in the Y direction in descending order of the height H starting from the center of the formation area A in the X and Y directions. If any empty region is present in a placement zone Z in which other three-dimensional objects S are placed, three-dimensional objects S that can be placed in the empty region are placed, maximizing concentration of three-dimensional objects S in and around the first placement zone Z1. As shown in FIG. 11A, before placing three-dimensional objects S left in the formation container C into empty regions in a placement zone Z, the three-dimensional objects S that are already placed in the placement zone Z may be moved toward the left side in the X direction. As a result, a small empty region is present on the right side in the X direction of the second highest three-dimensional object S2, and a large empty region is present on the right side in the X direction of the third highest three-dimensional object S3.

Figure 11B:
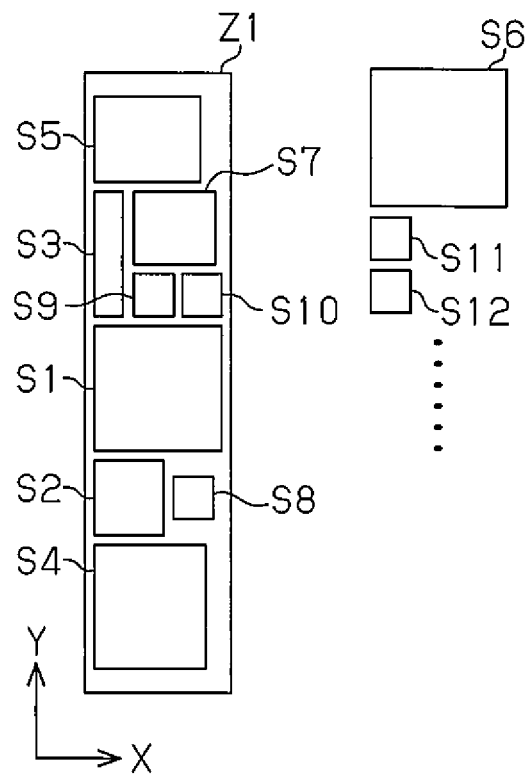

As shown in FIG. 11B, the three-dimensional objects S that are yet to be placed and able to be placed in empty regions in the first placement zone Z1 are placed in the empty regions. The eighth highest three-dimensional object S8 is placed in the empty region on the right side in the X direction of the second highest three-dimensional object S2. The seventh highest three-dimensional object S7, the ninth highest three-dimensional object S9, and the tenth highest three-dimensional object S10 are placed in the empty region on the right side in the X direction of the third highest three-dimensional object S3. Three-dimensional objects S are checked in descending order of height to determine whether the three-dimensional object can be placed in an empty space in the placement zone Z. The sixth highest three-dimensional object S6, the eleventh highest three-dimensional object S11, and the twelfth highest three-dimensional object S12, which cannot be placed in the first placement zone Z1, remain yet to be placed.

Empty regions are combined in the X direction in the placement zone Z, allowing large three-dimensional objects S to be placed in the empty regions. Thus, larger three-dimensional objects S can be placed compared to when three-dimensional objects S are placed in empty regions with other three-dimensional objects S placed at the center in the placement zone Z.

Accordingly, the present embodiment has the following advantages in addition to advantages (1) to (7) of the first embodiment.

(8) Three-dimensional objects S are placed in descending order of the height H into empty regions in a placement zone Z in which other three-dimensional objects S are placed. The effective use of empty regions in placement zones Z increases the number of three-dimensional objects S placed in each placement zone Z.

(9) Three-dimensional objects S are placed in descending order of the height H in empty regions in a placement zone Z that are formed when the three-dimensional objects S that are already present in the placement zone Z are moved toward one edge. Moving the three-dimensional objects S that are already placed in the placement zone Z toward one edge maximizes empty regions in the X direction, allowing larger three-dimensional objects S to be placed in the empty regions.

The embodiments described above may be modified as follows.

Figure 12:
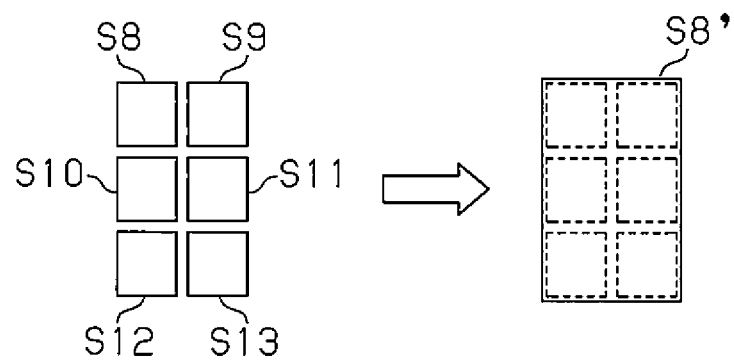
FIG. 12 is a diagram showing placement of three-dimensional objects according to a stereolithography method of a modification.

In the embodiments described above, a plurality of small three-dimensional objects S, if any, may be grouped into one three-dimensional object S and placed in a placement zone Z. For example, as shown in FIG. 12, the eighth to thirteenth highest three-dimensional objects S8 to S13 are placed in a placement zone Z as one three-dimensional object S8'. Placing these three-dimensional objects as one three-dimensional object in a placement zone Z rather than as separate three-dimensional objects facilitates the processing of the three-dimensional objects S.

Figure 13:
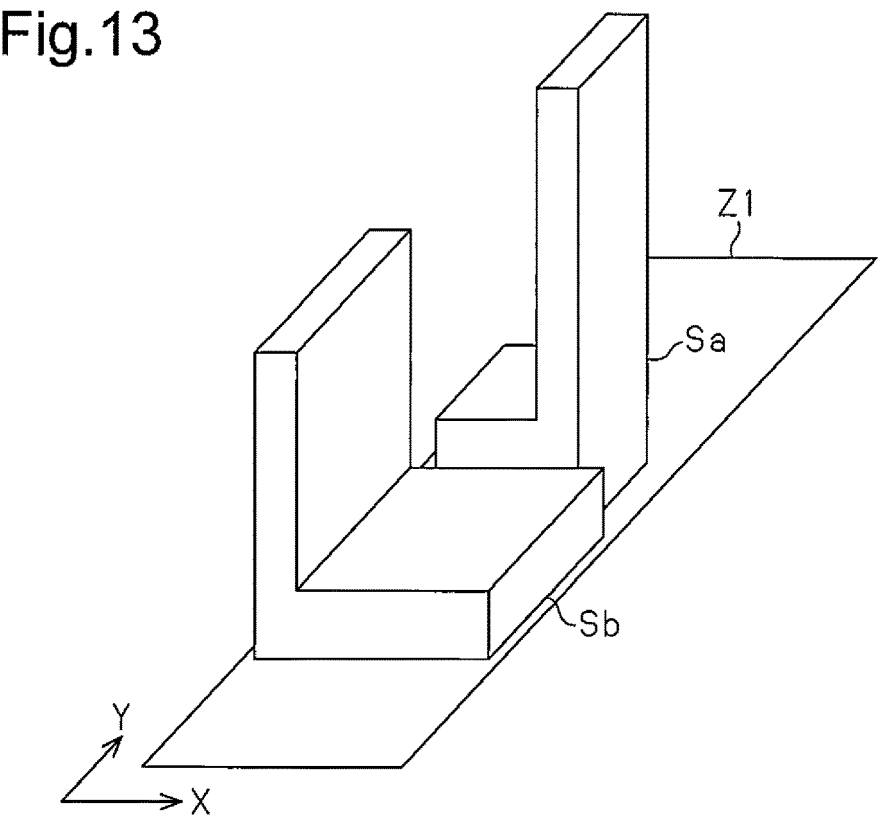
FIG. 13 is a diagram showing placement of three-dimensional objects according to a stereolithography method.
Figure 14:
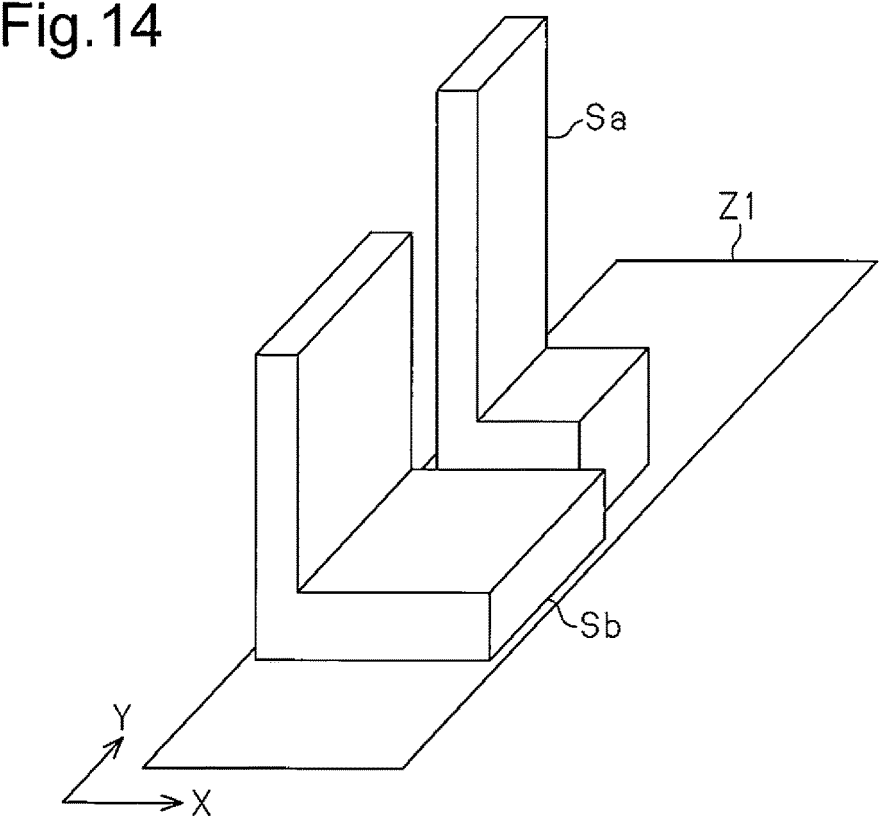
FIG. 14 is a diagram showing placement of three-dimensional objects S according to a stereolithography method of a modification.

In the embodiments described above, a three-dimensional object S may be rotated by 180 degrees according to the shape of the three-dimensional object S. For example, as shown in FIG. 13, three-dimensional objects Sa and Sb are placed in the first placement zone Z1. The upper sections of the three-dimensional objects Sa and Sb are located on different sides in the X direction. That is, the upper section of the three-dimensional object Sa is on the right side in the X direction, while the upper section of the three-dimensional object Sb is on the left side in the X direction. As shown in FIG. 14, rotating the three-dimensional object Sa by 180 degrees on the XY plane places the upper sections of the three-dimensional objects Sa and Sb on the left side in the X direction, that is, on the same side. This decreases the moving amount of the recoater 17 in the X direction as the formation progresses, shortening the formation time. The 180-degree rotation on the XY plane can be performed with the shape of the virtual cuboid maintained. Thus, the rotation may be performed in step S6 or immediately before completing the placement.

Figure 15:
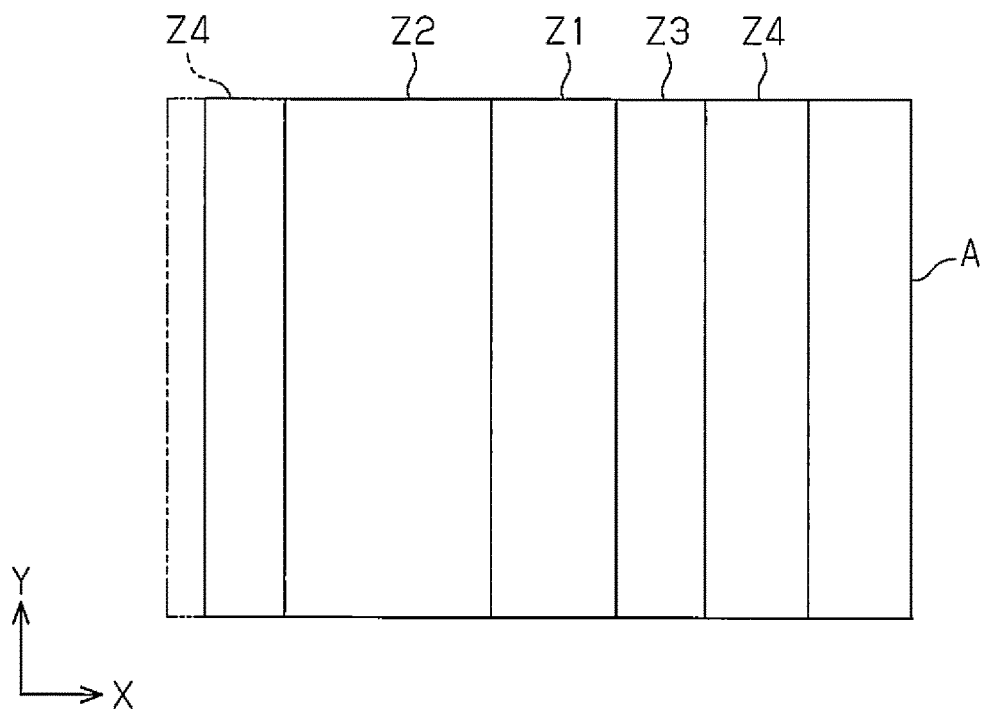
FIG. 15 is a diagram showing placement of three-dimensional objects S according to a stereolithography method of a modification.

In the embodiments described above, for an integer n that is greater than or equal to 2, the (n+1)th placement zone Z is set such that the first to (n−1)th placement zones Z1 to Z(n−1) are arranged between the nth placement zone Zn and the (n+1)th placement zone Z(n+1). However, for an integer n that is greater than or equal to 2, from the areas in the formation area A that are unoccupied by a placement zone Z, the (n+1)th placement zone Z may be placed in one of the areas that is greater in width in the X direction. For example, as shown in FIG. 15, the fourth placement zone Z4 is set on the left side of the second placement zone Z2. However, if the fourth placement zone Z4 cannot be placed within the formation area A, the fourth placement zone Z4 may be placed on the right side of the third placement zone Z3. Alternatively, the fourth placement zone Z4 may be placed on the left side of the second placement zone Z2, and the first placement zone Z1 may be shifted from the center in the X direction in the formation area A toward the right side so that the first to fourth placement zones Z1 to Z4 are placed within the formation area A. In other words, the first to fourth placement zones Z1 to Z4 may be shifted toward the right side in the X direction of the formation area A.

Figure 16:
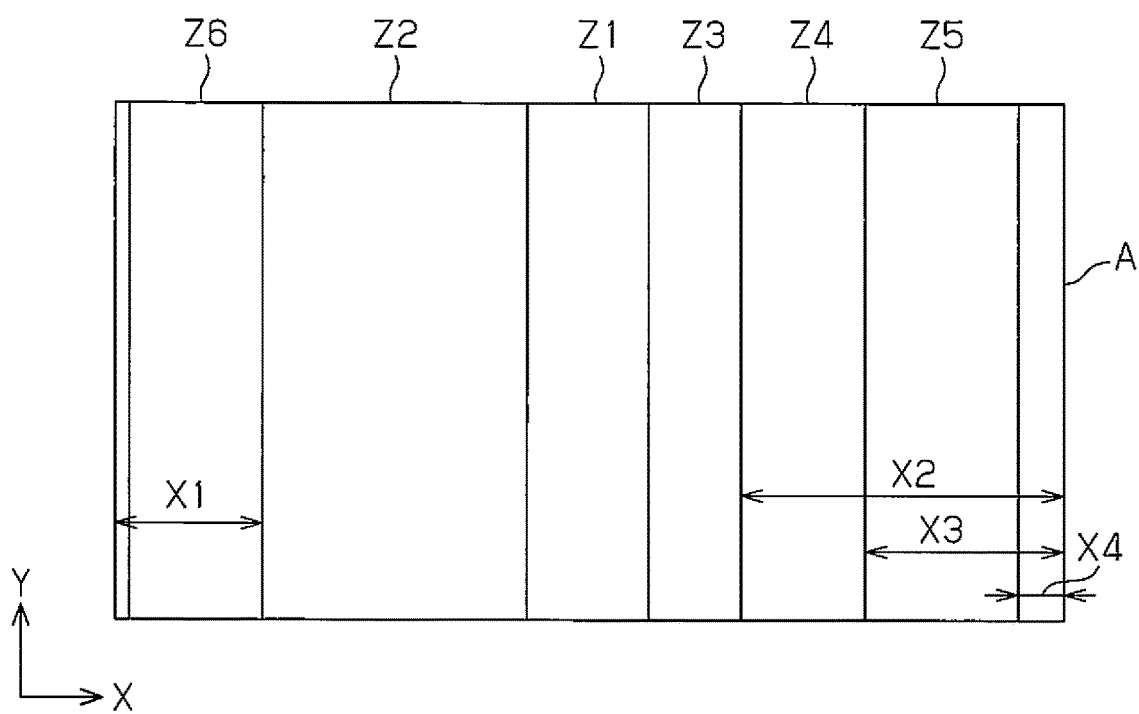
FIG. 16 is a diagram showing placement of three-dimensional objects S according to a stereolithography method of a modification.

Referring to FIG. 16, the fourth to sixth placement zones Z4 to Z6 may be set as follows after setting the first to third placement zones Z1 to Z3 in the formation area A. To set the fourth placement zone Z4, the width X1 between the left edge of the second placement zone Z2 and the boundary of the formation area A and the width X2 between the right edge of the third placement zone Z3 and the boundary of the formation area A are compared. The fourth placement zone Z4 is then placed in the area on the right side of the third placement zone Z3 that is greater in width. When the fifth placement zone Z5 is set, the width X1 between the left edge of the second placement zone Z2 and the boundary of the formation area A and the width X3 between the right edge of the fourth placement zone Z4 and the boundary of the formation area A are compared. The fifth placement zone Z5 is then placed in the area on the right side of the fourth placement zone Z4 that is greater in width. When the sixth placement zone Z6 is set, the width X1 between the left edge of the second placement zone Z2 and the boundary of the formation area A and the width X4 between the right edge of the fifth placement zone Z5 and the boundary of the formation area A are compared. The sixth placement zone Z6 is then placed in the area on the left side of the second placement zone Z2 that is greater in width. Such a setting increases the number of placement zones Z set in the formation area A.

Figure 17:
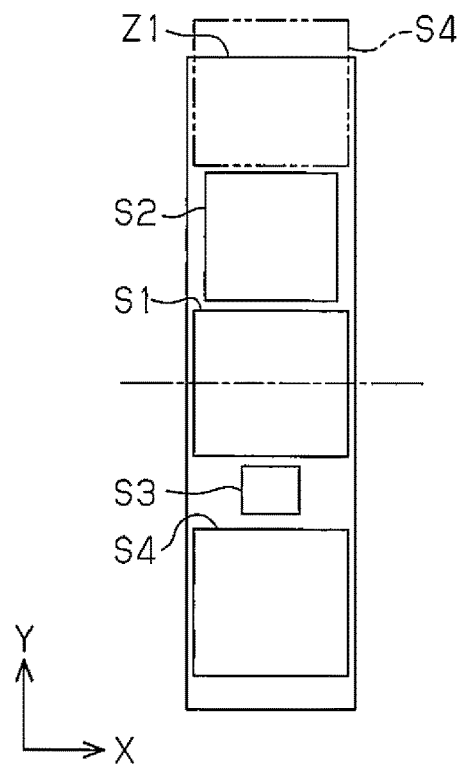
FIG. 17 is a diagram showing placement of three-dimensional objects S according to a stereolithography method of a modification.

In the embodiments described above, for an integer n that is greater than or equal to 2, the three-dimensional object Sn having the (n+1)th greatest height is placed such that the three-dimensional objects S1 to S(n−1) having the greatest to (n−1)th greatest heights are located between the three-dimensional object Sn having the nth greatest height and the three-dimensional object S(n+1) having the (n+1)th greatest height. However, for an integer n that is greater than or equal to 2, from the areas in the placement zone Z that are unoccupied by a three-dimensional object S, the three-dimensional object S(n+1) having the (n+1)th greatest height may be placed in one of the areas that is greater in width in the Y direction. For example, referring to FIG. 17, after the highest to third highest three-dimensional objects S1 to S3 are placed in the first placement zone Z1, the fourth highest three-dimensional object S4 is placed on the upper side in the Y direction of the second highest three-dimensional object S2. However, since the second highest three-dimensional object S2 cannot be placed within the first placement zone Z1, the fourth highest three-dimensional object S4 is placed on the lower side of the third highest three-dimensional object S3. Such a placement increases the number of three-dimensional objects S placed in each placement zone Z.

Figure 18:
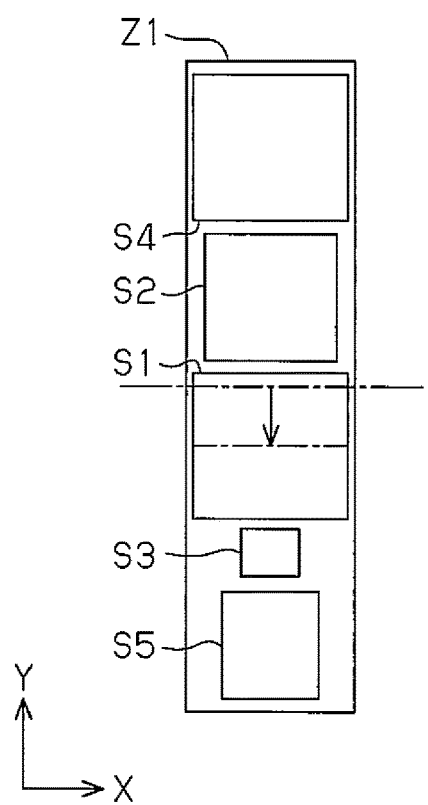
FIG. 18 is a diagram showing placement of three-dimensional objects S according to a stereolithography method of a modification.

In the embodiments described above, the highest three-dimensional object S1 is placed in a central section in the Y direction of a placement zone Z, and three-dimensional objects S are then placed in order on opposite sides of the highest three-dimensional object S1. However, placement of a three-dimensional object S may fail due to a lack of area in the Y direction. In such a case, the highest three-dimensional object S1 may be shifted in the Y direction, if the shifting allows a three-dimensional object S to be placed within the placement zone Z. For example, as shown in FIG. 18, the highest three-dimensional object S1 is placed in the first placement zone Z1, the second highest three-dimensional object S2 is placed on the upper side in the Y direction of the highest three-dimensional object S1, and the fourth highest three-dimensional object S4 is placed on the upper side in the Y direction of the second highest three-dimensional object S2. The third highest three-dimensional object S3 is placed on the lower side in the Y direction of the highest three-dimensional object S1, and the fifth highest three-dimensional object S5 is placed on the lower side in the Y direction of the third highest three-dimensional object S3. The highest three-dimensional object S1 is shifted downward from the center in the Y direction of the first placement zone Z1 so that the highest to fifth highest three-dimensional objects S1 to S5 are placed within the first placement zone Z1.

In the embodiments described above, the width of a placement zone Z is changed according to the widths L of three-dimensional objects S. However, if the sizes of three-dimensional objects S are known to some extent, the widths of placement zones Z may be set in advance.

The embodiments described above perform rotation and arrangement in the formation container C. However, rotation may be omitted, and arrangement only may be performed. In this case, three-dimensional objects S are formed efficiently according to at least the heights H.

Figure 19:
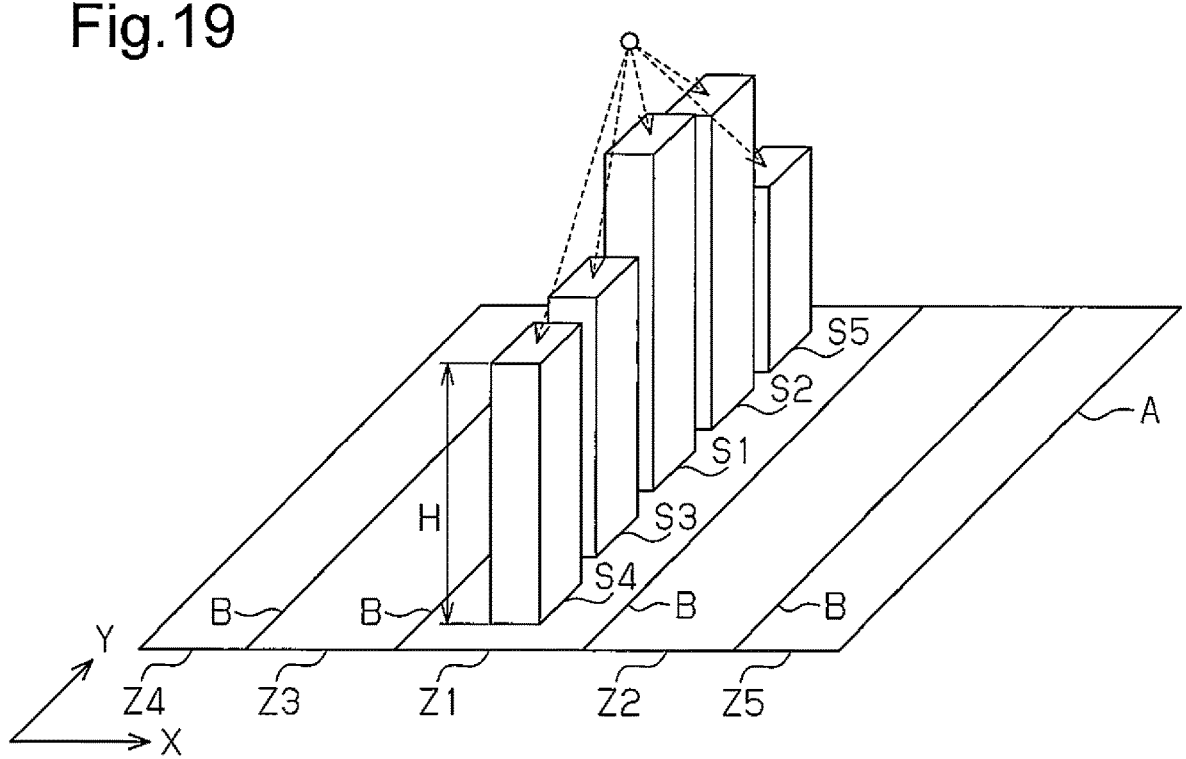
FIG. 19 is a diagram showing a state of three-dimensional objects placed by a stereolithography method of a modification.

The embodiments described above place the second and fourth placement zones Z2 and Z4 on the left side of the first placement zone Z1 as viewed in FIG. 2 and place the third and fifth placement zones Z3 and Z5 on the right side of the first placement zone Z1 as viewed in FIG. 2. However, the nth placement zone Zn and the (n+1)th placement zone Z(n+1) may be placed on one of the right and left sides of the first placement zone Z1. For example, as shown in FIG. 19, the second placement zone Z2 may be on the right side of the first placement zone Z1 as viewed in FIG. 19, and the third placement zone Z3 may be on the left side of the first placement zone Z1 as viewed in FIG. 19. The fourth placement zone Z4 may be on the left side of the first placement zone Z1 as viewed in FIG. 19, and the fifth placement zone Z5 may be on the right side of the first placement zone Z1 as viewed in FIG. 19.

In the embodiments described above, the second highest three-dimensional object S2 and the fourth highest three-dimensional object S4 are located frontward in the Y direction of the highest three-dimensional object S1. In addition, the third highest three-dimensional object S3 and the fifth highest three-dimensional object S5 are located rearward in the Y direction of the highest three-dimensional object S1. However, the nth highest three-dimensional object Sn and the (n+1)th highest three-dimensional object S(n+1) may be placed one of frontward and rearward of the highest three-dimensional object S1. For example, as shown in FIG. 19, the second highest three-dimensional object S2 may be located rearward in the Y direction of the highest three-dimensional object S1, and the third highest three-dimensional object S3 may be located frontward in the Y direction of the highest three-dimensional object S1. The fourth highest three-dimensional object S4 may be located frontward in the Y direction of the highest three-dimensional object S1. The fifth highest three-dimensional object S5 may be located rearward in the Y direction of the highest three-dimensional object S1.

Figure 20:
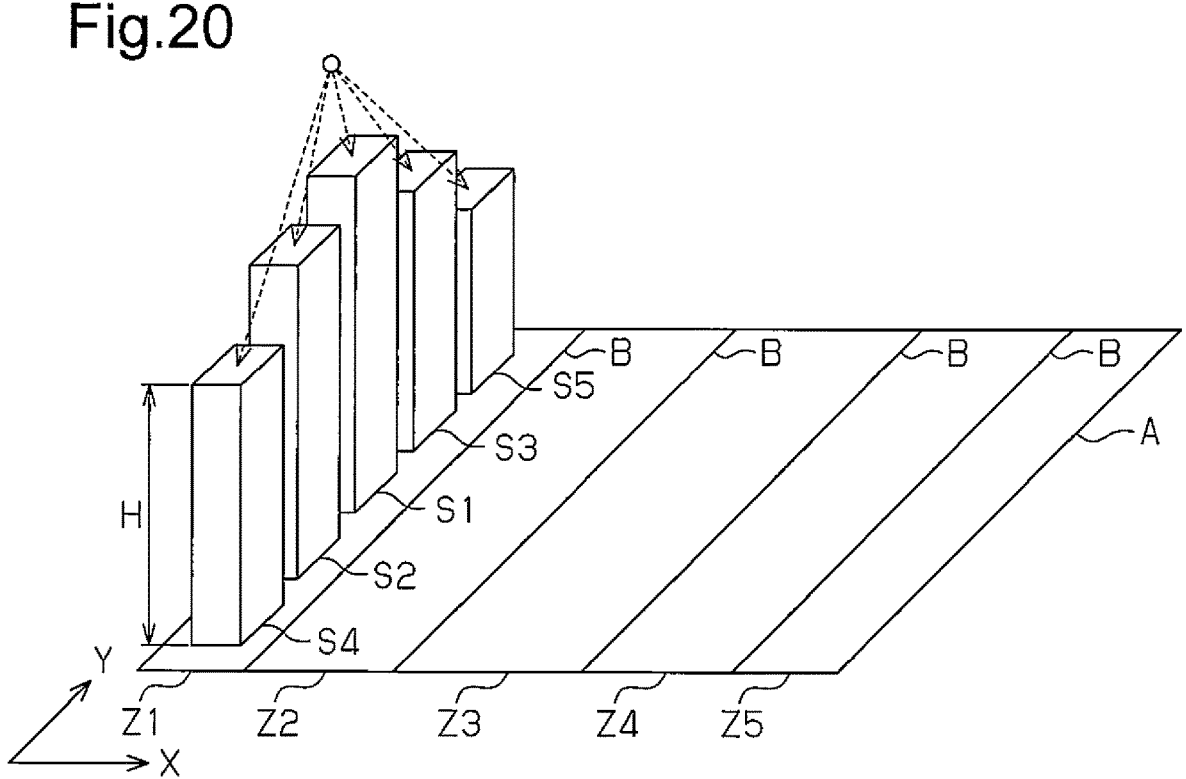
FIG. 20 is a diagram showing a state of three-dimensional objects placed by a stereolithography method of a modification.

The embodiments described above set the second placement zone Z2 and the third placement zone Z3 on opposite sides of the first placement zone Z1. As for the fourth placement zone Z4 and subsequent zones, when n is a multiple of 2, the first to (n−1)th placement zones Z1 to Z(n−1) are arranged between the nth placement zone Zn and the (n+1)th placement zone Z(n+1). However, if the scanner 13, which is typically located above the center of the formation area A, is placed at an edge, the first placement zone Z may be placed under the scanner 13. That is, the first placement zone Z1 may be set at an edge of the formation area A, and the first placement zone Z1 and the subsequent placement zones may be set in order. For example, as shown in FIG. 20, the first placement zone Z1 may be set at the left edge of the formation area A as viewed in FIG. 20, and the second placement zone Z2 and subsequent placement zones may be set in order. This facilitates setting of placement zones Z compared to when the first placement zone Z1 is set at the center and other placement zones Z are set on opposite sides of the first placement zone Z1. This modification is particularly advantageous for a smaller formation area A since a smaller formation area A involves a smaller degree of change by which the irradiation shape of the light beam directed to the photocurable material is changed into an oval shape.

The embodiments described above place the highest three-dimensional object S at the center in the X direction of the formation area A. However, the highest three-dimensional object S may be shifted from the center in the X direction of the formation area A.

Figure 21:
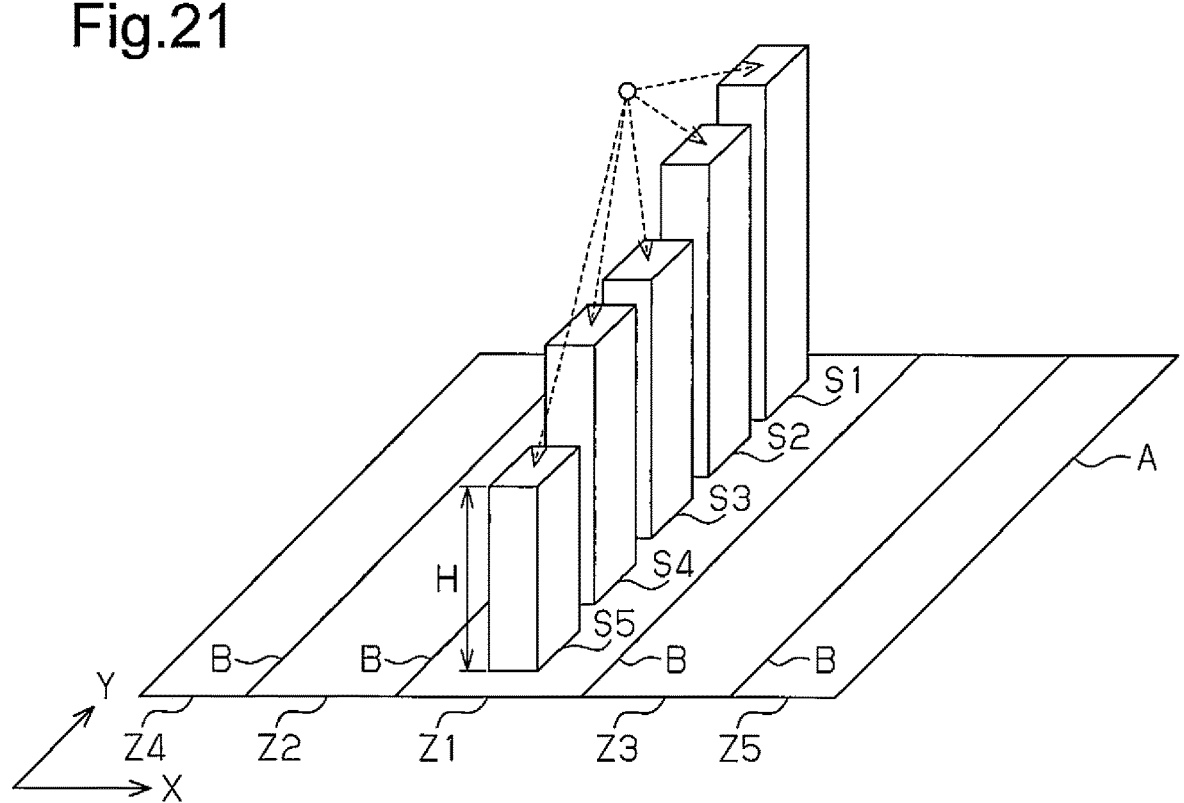
FIG. 21 is a diagram showing a state of three-dimensional objects placed by a stereolithography method of a modification.

The embodiments described above place the highest three-dimensional object S at the center in the Y direction of the formation area A. However, three-dimensional objects S may be arranged from one edge of a placement zone Z in descending order of the height H. For example, as shown in FIG. 21, three-dimensional objects S are placed from the rear edge in the X direction of the placement zone Z1 in descending order of the height H. Three-dimensional objects S may be placed from the front edge in the X direction of the placement zone Z1 in descending order of the height H. This facilitates the placement compared to when the highest three-dimensional object S1 is placed at the center of the placement zone Z and other three-dimensional objects S are placed on opposite sides of the highest three-dimensional object S1. This modification is particularly advantageous for a smaller formation area A since a smaller formation area A involves a smaller degree of change by which the irradiation shape of the light beam directed to the photocurable material is changed into an oval shape.

Figure 22:
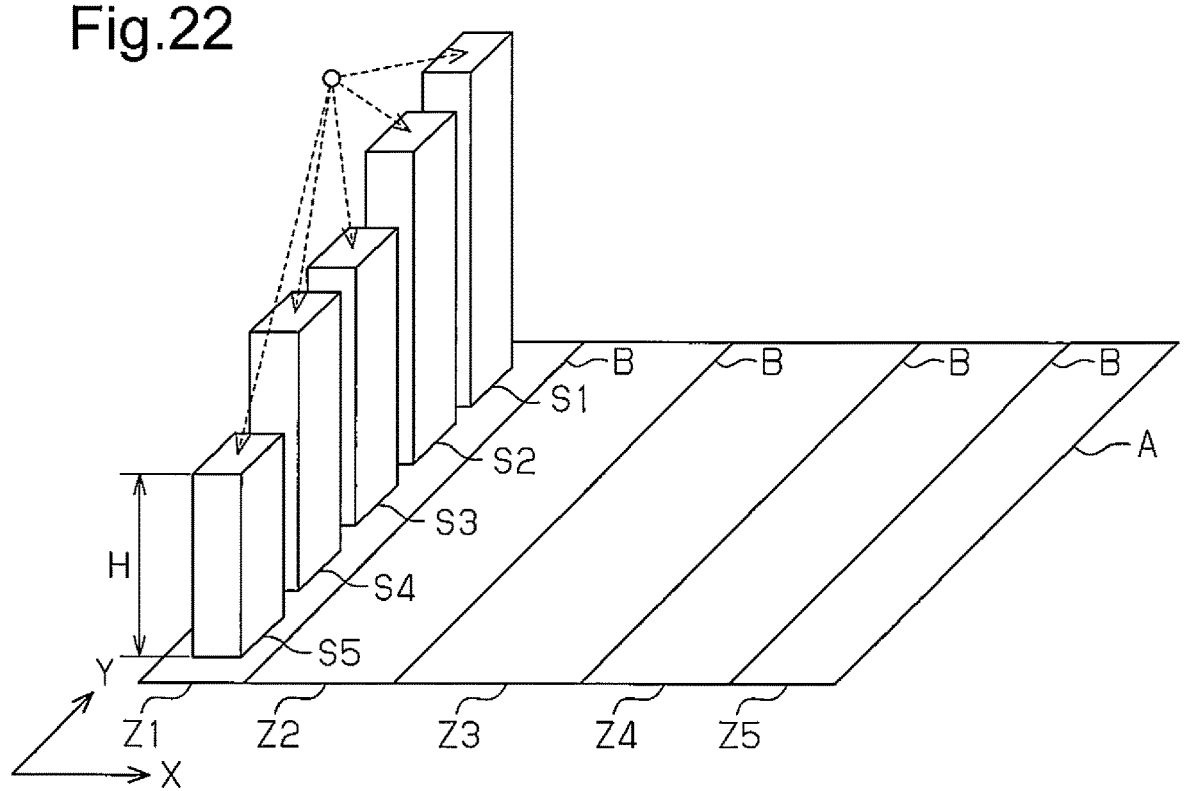
FIG. 22 is a diagram showing a state of three-dimensional objects placed by a stereolithography method of a modification.

Further, as shown in FIG. 22, the first placement zone Z1 may be set at the left edge of the formation area A as viewed in FIG. 22, the second placement zone Z2 and subsequent zones may be set in order, and three-dimensional objects S may be placed from the rear edge in the X direction of the placement zone Z1 in descending order of the height H. This reduces the movement range of the recoater 17 and the formation time.

In the embodiments described above, each three-dimensional object S to be formed is measured for outer dimensions as a virtual cuboid in step S3. However, instead of using such a virtual cuboid, the outer dimensions of the three-dimensional object S may be used for rotation and arrangement.

In the embodiments described above, the rotation of three-dimensional objects S in step S6 and the arrangement of three-dimensional objects S in step S7 may be performed in reverse order. Alternatively, the rotation and arrangement may be performed simultaneously.

The embodiments described above set the formation container C, which rotates and arranges three-dimensional objects S. However, the formation container C may be omitted, and three-dimensional objects S may be rotated and arranged in the placement process.

The embodiments described above create an additional placement zone Z when not all the three-dimensional objects S are placed in a placement zone Z (step S8). However, placement zones Z may be created in advance, and the widths W of the placement zones Z may be changed according to the widths L of the placed three-dimensional objects S.

The embodiments described above place three-dimensional objects S a few millimeters away from the borderlines B of placement zones Z to limit interference between the three-dimensional objects S. In other words, the three-dimensional objects S are not placed in the areas in the placement zones Z within a few millimeters from the borderlines B. However, a clearance having a width of a few millimeters may be provided around each three-dimensional object S in advance.

In the embodiments described above, automatic placement of three-dimensional objects S to be formed is performed by the controller 10 of the stereolithography apparatus. However, automatic placement of three-dimensional objects S to be formed may be performed outside the stereolithography apparatus, and the result of the placement may be entered into the controller 10 of the stereolithography apparatus.

The technical concept that may be recognized from the embodiments described above and its advantage are as follows.

(a) The stereolithography method according to claims 1 to 6, characterized in that each three-dimensional object is measured for outer dimensions as a virtual cuboid.

In the method described above, each three-dimensional object is measured for outer dimensions as a virtual cuboid. Thus, the height, depth, and width of a three-dimensional object having a complicated shape can be obtained easily.

10: controller, 11: vat, 13: scanner, 12: laser, 15: elevator platform, 16: platform driving device, 17: recoater, 18: recoater driving device, A: formation area, B: borderline, C: formation container, D: depth, H: height, L: width, S, S1, S2, S3, S4 and S5: three-dimensional object, W: width, X: movement direction, Y: extension direction, Z, Z1, Z2, Z3, Z4, Z5, Z6 and Z7: placement zone

What is claimed is:

1. A stereolithography method for forming a formed object that corresponds to a set of three-dimensional objects in a formation area on an elevator platform by selectively directing a light beam to a curable material and curing the curable material, the method comprising:
by a controller, placing the set of three-dimensional objects in the formation area,
by the controller, setting a plurality of placement zones in the formation area, wherein the placement zones are defined by borderlines along an x-axis extending in an extension direction of a recoater for leveling a liquid surface, and
by the controller, placing the three-dimensional objects in the placement zones in descending order of height, wherein the three-dimensional objects are placed in each of the placement zones in order from a first placement zone of the placement zones, wherein the three-dimensional object having the highest height is placed in a central section in the first placement zone in the extension direction of the recoater, and wherein
after a first placement of three-dimensional objects is completed in each placement zone and before placing three-dimensional objects in a next placement zone, three-dimensional objects that are yet to be placed and able to be placed in an empty region in the placement zone in which the three-dimensional objects have been already placed are placed in descending order of height in the empty region in both the x and y directions of the placement zones, and wherein the controller centrally sets the first placement zone along an x-direction in the formation area.

2. The stereolithography method according to claim 1, wherein
the plurality of placement zones includes three or more placement zones, and
for an integer n that is greater than or equal to 2, an (n+1)th placement zone is set such that the first to (n−1)th placement zones are arranged between an nth placement zone and the (n+1)th placement zone.

3. The stereolithography method according to claim 1, wherein
the plurality of placement zones includes three or more placement zones,
each of the placement zones is set to be adjacent to another of the placement zones, and
for an integer n that is greater than or equal to 2, from areas in the formation area that are unoccupied by placement zones, an (n+1)th placement zone is set in one of the areas that is greater in width in a movement direction of the recoater.

4. The stereolithography method according to claim 1, wherein
the first placement zone includes a center of a movement range of the recoater in a movement direction of the recoater.

5. The stereolithography method according to claim 1, wherein
the first placement zone is set to be adjacent to a first edge of the formation area in a movement direction of the recoater, and
for an integer n that is greater than or equal to 2, an nth placement zone is set to be adjacent to an (n−1)th placement zone.

6. The stereolithography method according to claim 1, wherein
in each of the placement zones in which three or more three-dimensional objects are placed, for an integer n that is greater than or equal to 2, a three-dimensional object having an (n+1)th greatest height is set such that three-dimensional objects having greatest to (n−1)th greatest heights are located between a three-dimensional object having an nth greatest height and the three-dimensional object having an (n+1)th greatest height.

7. The stereolithography method according to claim 1, wherein
in each of the placement zones in which three or more three-dimensional objects are placed, for an integer n that is greater than or equal to 2, from empty regions in the placement zone, a three-dimensional object having an (n+1)th greatest height is placed in one of the empty regions that is greater in width in the extension direction of the recoater.

8. The stereolithography method according to claim 6, wherein
a highest three-dimensional object is placed in a central section in the placement zone in a direction corresponding to a width of the recoater in the extension direction of the recoater.

9. The stereolithography method according to claim 1, wherein
in each of the placement zones in which two or more three-dimensional objects are placed,
a three-dimensional object having a greatest height is placed adjacent to a first edge of the placement zone in a movement direction of the recoater, and
for an integer n that is greater than or equal to 2, a three-dimensional object having an nth greatest height is placed adjacent to a three-dimensional object having an (n−1)th greatest height.

10. The stereolithography method according to claim 1, wherein
after the first placement of three-dimensional objects is completed in each placement zone and before placing three-dimensional objects in a next placement zone,
the three-dimensional objects that are already placed in the placement zone are re-placed at positions closer to a first edge of the placement zone in a movement direction of the recoater, and
three-dimensional objects yet to be placed are then placed in descending order of height in an empty region, which is unoccupied by three-dimensional objects, in the placement zone.

11. The stereolithography method according to claim 1, wherein
two directions that are parallel to bases of the three-dimensional objects and perpendicular to each other are defined, and
the longer of lengths in the two directions of each three-dimensional object is defined as a length in the extension direction of the recoater.

12. The stereolithography method according to claim 1, wherein a width of each placement zone in a movement direction of the recoater is changed according to lengths in a movement direction of the recoater of the three-dimensional objects that are placed in the placement zone.

* * * * *